United States Patent
Krishnamurthy

(10) Patent No.: US 11,727,539 B1
(45) Date of Patent: Aug. 15, 2023

(54) ROBUST AUTOMATED CALIBRATION OF KERNELS FOR DEBLURRING IMAGES

(71) Applicant: Amazon Technologies, Inc., Seattle, WA (US)

(72) Inventor: Harish Kashyap Krishnamurthy, Wellesley Hills, MA (US)

(73) Assignee: Amazon Technologies, Inc., Seattle, WA (US)

( * ) Notice: Subject to any disclaimer, the term of this patent is extended or adjusted under 35 U.S.C. 154(b) by 301 days.

(21) Appl. No.: 17/095,636

(22) Filed: Nov. 11, 2020

(51) Int. Cl.
   *G06K 9/36* (2006.01)
   *G06T 5/00* (2006.01)
   *G06T 9/00* (2006.01)

(52) U.S. Cl.
   CPC .............. *G06T 5/003* (2013.01); *G06T 9/00* (2013.01)

(58) Field of Classification Search
   CPC ........ H04N 7/50; H04N 7/30; H04N 7/26244; H04N 7/26313; H04N 7/26079; H04N 7/26563; H04N 7/26579; H04N 7/26393; H04N 7/2651; H04N 19/176; H04N 19/186; H04N 19/196; H04N 19/132; H04N 19/14; G06K 9/645; G06K 9/6202; G06K 9/03; G06K 9/20; G06K 9/32; G06T 9/007; G06T 9/00; G06T 3/40; H03M 7/30; H03M 7/4031; H03M 7/6011; H03M 7/6094
   See application file for complete search history.

(56) References Cited

U.S. PATENT DOCUMENTS

| | | | |
|---|---|---|---|
| 11,350,024 B1 * | 5/2022 | Stallman | H04N 5/23251 |
| 2012/0018518 A1 * | 1/2012 | Strom | G06T 5/40 |
| | | | 235/462.04 |

OTHER PUBLICATIONS

Usman Ali and Muhammad Tariq Mahmood, "Analysis of Blur Measure Operators for Single Image Blur Segmenation," Applied Sceince, May 17, 2018, 32 pages.
Brandon Smith and Mikola Lyenko, "Image Deblurring," cs.wisc.edu, Mar. 29, 2019, 10 Pages.
Tao et al., "Scale-Recurrent Network for Deep Image Deblurring," arXiv:1802.01770v1 [cs.CV] Feb. 6, 2018, 9 pages.
Claus Herther, "Dice, Polls & Dirichlet Multinomials," Towards Data Science, Jan. 2, 2019, 22 Pages.
S. McCloskey and S. Venkatesha, "Temporally Coded Illumination for Rolling Shutter Motion De-blurring," 2017 IEEE Winter Conference on Applications of Computer Vision (WACV), Santa Rosa, CA, 2017, pp. 1287-1295, doi: 10.1109/WACV.2017.148. [Abstract Only].
S. Suh, H. Lee, Y. O. Lee, P. Lukowicz and J. Hwang, "Robust Shipping Label Recognition and Validation for Logistics by Using Deep Neural Networks," 2019 IEEE International Conference on Image Processing (ICIP), Taipei, Taiwan, 2019, pp. 4509-4513, doi: 10.1109/ICIP.2019.8803412. [Abstract Only].

(Continued)

*Primary Examiner* — Duy M Dang
(74) *Attorney, Agent, or Firm* — Kilpatrick Townsend & Stockton LLP

(57) ABSTRACT

Techniques for deblur kernel calibration are provided. A first distribution of decode counts is determined for a plurality of deblur kernels. The plurality of deblur kernels are ranked based on the first distribution. An input image depicting a label is received, and a first deblur kernel of the plurality of deblur kernels is selected based on the ranking. The input image is processed using the first deblur kernel.

18 Claims, 10 Drawing Sheets

(56) References Cited

OTHER PUBLICATIONS

J. Zhang, J. Jia, Z. Zhu, X. Min, G. Zhai and X. Zhang, "Fine Detection and Classification of Multi-class Barcode in Complex Environments," 2019 IEEE International Conference on Multimedia & Expo Workshops (ICMEW), Shanghai, China, 2019, pp. 306-311, doi: 10.1109/ICMEW.2019.00-69. [Abstract Only].

Li Xu and Jiaya Jia, "Depth-aware motion deblurring," in 2012 IEEE International Conference on Computational Photography (ICCP), Seattle, WA, 2012 pp. 1-8.

Orieux et al., "Bayesian estimation of regularization and point spread function parameters for Wiener-Hunt deconvolution," vol. 27, No. 7/Jul. 2010/J. Opt. Soc. Am. A, 15 pages.

Y. Kato, D. Deguchi, T. Takahashi, I. Ide and H. Murase, "Low Resolution QR-Code Recognition by Applying Super-Resolution Using the Property of QR-Codes," 2011 International Conference on Document Analysis and Recognition, Beijing, China, 2011, pp. 992-996, doi: [Abstract Only].

Y. Chen, Z. Yang, Z. Bai and J. Wu, "Simultaneous Real-Time Segmentation of Diversified Barcode Symbols in Complex Background," 2008 First International Conference on Intelligent Networks and Intelligent Systems, Wuhan, China, 2008, pp. 527-530, doi: 10.1109/ICINIS.2008.163. [Abstract Only].

Runze Zhou and Xiaoxin Guo, "A new method of angle-robust multiple 1D-barcodes detection," 2016 2nd IEEE International Conference on Computer and Communications (ICCC), Chengdu, 2016, pp. 433-438, doi: 10.1109/CompComm.2016.7924738. [Abstract Only].

A. Zamberletti, I. Gallo and S. Albertini, "Robust Angle Invariant 1D Barcode Detection," 2013 2nd IAPR Asian Conference on Pattern Recognition, Naha, Japan, 2013, pp. 160-164, doi: 10.1109/ACPR.2013.17. [Abstract Only].

L. Chen, H. Man and H. Jia, "On Scanning Linear Barcodes From Out-of-Focus Blurred Images: A Spatial Domain Dynamic Template Matching Approach," in IEEE Transactions on Image Processing, vol. 23, No. 6, pp. 2637-2650, Jun. 2014, doi: 10.1109/TIP.2014.2319579. [Abstract Only].

T. Edeler, M. Arbeiter, K. Ohliger, S. Hussmann and A. Mertins, "A new shift estimation algorithm for barcode super resolution," IEEE 10th International Conference on Signal Processing Proceedings, 2010, pp. 720-723, doi: 10.1109/ICOSP.2010.5655759. [Abstract Only].

R. Raskar, A. Agrawal, J. Tumblin, "Coded Exposure Photography: Motion Deblurring using Fluttered Shutter", pp. 1-10 <http://www.cs.cmu.edu/~ILIM/projects/IM/aagrawal/sig06/CodedExposureLowres.pdf>.

J. Simsekli and T. Birdal, "A unified probabilistic framework for robust decoding of linear barcodes," 2015 IEEE International Conference on Acoustics, Speech and Signal Processing (ICASSP), 2015, pp. 1946-1950, doi: 10.1109/ICASSP.2015.7178310. [Abstract Only].

E. Tekin and J. Coughlan, "A Bayesian Algorithm for Reading 1D Barcodes," 2009 Canadian Conference on Computer and Robot Vision, 2009, pp. 61-67, doi: 10.1109/CRV.2009 31. [Abstract Only].

A. Zisserman, "Lecture 3: Image Restoration", B14 Image Analysis, Michaelmas 2014, pp. 1-48.

Jia et al., "EMBDN: An Efficient Multiclass barcode Detection Network for Complicated Enviroments," IEEE Internet of Things Journal, vol. 6, Issue 6, 3 pages.

Yan Zhang, Haitao Pu, Jian Lian, "Quck Response barcode deblurring via L0 Regularisation Based Sparse Optimisation," IET Digital Library, vol. 13, Issue 8, Jun. 20, 2019, p. 1254-1258.

Seungjun Nah, Tae Hyun Kim, Kyoung Mu Lee, "Deep Multi-scale Convolutional Neural Network for Dynamic Scene Deblurring,"CVPR, 2017, 9 pages.

Matrox Imaging Library, Machine vision, image analysis and medical aging software development kit, Matrox Imaging Library 9, Release 2, 26 pages.

\* cited by examiner

ROBUST AUTOMATED CALIBRATION OF KERNELS FOR DEBLURRING IMAGES

BACKGROUND

The present disclosure relates to signal processing, and more specifically, to automated system calibration to improve image deblurring.

Captured images often include some level of noise and/or distortion (such as blur) due to a variety of factors, including motion or other aspects of the subject of the images (e.g., packages on a moving platform) as well as the configuration of the image capturing devices themselves (e.g., incorrect focus, faulty or dirty lenses, and the like). A variety of approaches have been applied to help correct these distortions, with varying success.

For example, Wiener filters have been used to deblur images. However, the specific parameters used for the deblurring can have a significant effect on the quality of the resulting deblurred images. It is a difficult, time consuming, and largely manual process to configure such parameters. This significantly reduces the adaptability of the system, as differing stations or deployments typically require differing parameters in order to function effectively and accurately. Additionally, it is common for the contextual environment to change over time, leading to degrading results even at the same station. Further, when the image subject changes (e.g., when packages of differing size are imaged), the amount of blur present for each subject can differ substantially. That is, when cameras are focused on a particular point, some packages may be in focus while others are blurred to varying amounts depending on their size and location. There is a need for automated calibration of such systems.

DETAILED DESCRIPTION

Figure 1:
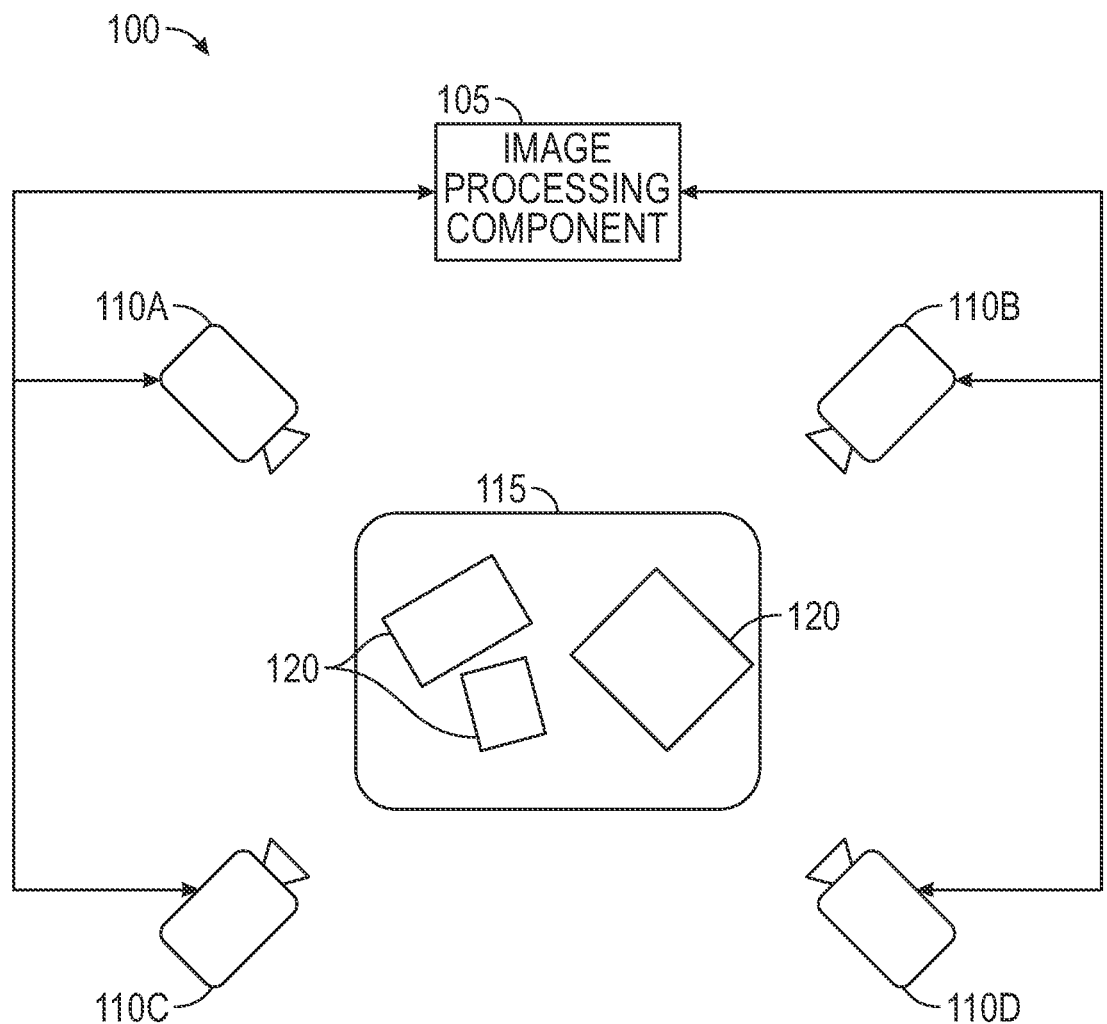
FIG. 1 depicts an environment including a image processing component configured to perform automated calibration to improve image processing, according to some embodiments disclosed herein.

Embodiments of the present disclosure provide techniques to automatically calibrate and configure image deblurring systems based on decode distributions. This can improve the image processing workflow significantly, and allow deployments to automatically refine themselves as conditions shift. Further, the automated techniques described herein allow new deployments to be instantiated quickly and effectively without the need for significant training or calibration. By utilizing decode distributions to calibrate the deblur pipeline, embodiments of the present disclosure enable rapid and scalable adaptability and can significantly improve the functioning of the image processing system and the overall workflow in the deployment.

In some examples described herein, the system is configured to deblur and process images of packages and/or labels (e.g., in a sorting facility). However, embodiments of the present disclosure are readily applicable to a wide variety of signal processing systems, as understood by one of skill in the art. For example, in some embodiments, the automated calibration described herein can be used to provide autofocus calibration that allows original image capture to be improved. Generally, embodiments of the present disclosure can be readily applied to a variety of signal processing tasks including and beyond image processing.

In some embodiments described herein, the image processing system is configured to use a set of deblur kernels to process captured images. Generally, deblur kernels may be used to process an image by convolving the kernel with the image to generate a new image. In some embodiments, the original blurring may be modeled as the result of convolving an original signal (e.g., the light reflected off a label, depicting a "true" image) with a blur kernel (caused by, for example, motion or an out-of-focus camera). The resulting blurred image reflects what is actually captured by the system. Subsequently, the system can convolve one or more deblur kernels with the captured image to attempt to recover the original "true" signal. In some embodiments, this can be referred to as a (blind) deconvolution process.

In an embodiment, each deblur kernel is defined by a set of parameters that affect the result of the process. For example, the diameter or size of the deblur kernel has a significant effect on the final processed result, but it is difficult or impossible to know the best size without significant manual experimentation. Additionally, kernels of differing size may preform differently on different image subjects. For example, suppose the images are captured by a stationary fixed-focus camera as packages move past. Packages of differing sizes will naturally fall in a different focal plane from the perspective of the camera, causing each to have a different amount of blur. Other kernel parameters include, for example, the signal-to-noise (SNR) ratio of the kernel, which relates to the amount of noise in the captured images due to the environment (e.g., due to vibrations, air quality, electromagnetic interference, and the like).

In some embodiments, the system can maintain a set of deblur kernels with differing parameters. By monitoring how often each kernel allows captured images to be successfully decoded (referred to herein as decode counts or data), the system can compute decode distributions and rank the deblur kernels based on the likelihood that they will cause captured images to be successfully decoded. For example, in one such embodiment, the system can use a maximum likelihood estimation (MLE) to rank the kernels. In at least one embodiment, the system can generate a distribution to be used as a prior in order to compute new posterior distributions based on updated data, allowing the system to adapt automatically. For example, in one embodiment, the distribution is treated as a Dirichlet pair, where the posterior and prior distributions form a conjugate pair. This can allow the system to adapt with significantly fewer samples and enable more rapid calibration.

FIG. 1 depicts an environment 100 including an Image Processing Component 105 configured to perform automated calibration to improve image processing, according to some embodiments disclosed herein. In embodiments, the Image Processing Component 105 may be implemented using hardware, software, or a combination of hardware and software. As illustrated, the Image Processing Component 105 is communicatively coupled with a set of Image Capture Devices 110A-D (e.g., cameras). Although four Image Capture Devices 110 are depicted, in embodiments, there may be any number and variety of Image Capture Devices 110. Each Image Capture Device 110 is generally configured to capture image data and/or video data in the environment 100. The Image Capture Devices 110 collectively make up a "station." As used herein, a "station" is a physical area or deployment with one or more cameras or other Image Capture Devices 110 configured to capture images of the same region or area.

In the illustrated embodiment, the Image Capture Devices 110 are arranged to capture images of items on a Platform 115. The Platform 115 may be, for example, a portion of a conveyor belt or other moving system that moves items through the field of view of the Image Capture Devices 110. As illustrated, the Image Capture Devices 110A-D are arranged to capture different views or angles of the Platform 115. For example, supposing the items move from left to right across the screen, the Image Capture Device 110A may capture an image from the rear left of the items, while the Image Capture Device 110C captures images from the rear right. Similarly, the Image Capture Device 110B captures images from the front left, while Image Capture Device 110D captures images from the front right. Of course, in various embodiments there may be any number and arrangement of Image Capture Devices 110. For example, there may be Image Capture Devices 110 situated directly overheard and/or below the Platform 115, in front of or behind the area (e.g., between Image Capture Devices 110A and 110C), centered beside the Platform 115 (e.g., between Image Capture Devices 110A and 110B), and the like.

In the illustrated environment 100, the items are Packages 120. For example, the Packages 120 may be on a conveyor or other moving surface or device, and moving through the capture area where the Image Capture Device(s) 110 are pointed (e.g., in a package sorting center). In embodiments, the Packages 120 may be of any size, shape, type, orientation, and placement on the Platform 115. For example, the Packages 120 may include boxes, envelopes, bags, and the like. Although Packages 120 are used in non-limiting examples discussed herein, embodiments of the present disclosure are readily applicable to any image capturing environment.

In an embodiment, the Image Processing Component 105 is configured to process the captured image(s) from the Image Capturing Device(s) 110. This processing may include, for example, identification of the individual Packages 120 to allow them to be tracked and sorted. For example, in one embodiment, each Package 120 may include a label (e.g., a barcode, a shipping label, and the like) that can be used to uniquely identify the Package 120. In an embodiment, the Image Processing Component 105 can process the captured image(s) to identify such labels, perform any processing needed (such as deblur operations), and decode the images (e.g., by scanning a barcode) to identify the Packages 120. As used herein, an image can include an entire image, as well as any portion or region of an image (e.g., processing regions of the image that are determined to include a label or barcode).

In embodiments, the captured images may generally include any number, variety, and scale of distortions and imperfections. For example, due to the motion of the Packages 120 and/or movement or vibration of the Image Capture Devices 110, some amount of motion blur may be present. Similarly, noise or blur may be present in the captured images due to vibrations, interference, degradation of the Image Capture Devices 110, and the like. In embodiments, there may also be some amount of out-of-focus blur in the images.

In at least one embodiment, the Image Capture Devices 110 are fixed-focus imaging devices. That is, they are configured to capture images at a given focal plane which may be adjusted, but they do not automatically adjust their focus to ensure the captured images are not blurred. In some embodiments, the Image Capture Devices 110 may include an autofocus, but the images may nevertheless include some level of blur due to, for example, delays in the autofocus process, Packages 120 of differing sizes passing simultaneously, and the like.

In some embodiments, the Image Capture Devices 110 are manually focused to a given point in the field of view (e.g., a spot on or just over the Platform 115) in order to attempt to capture in-focus images of Packages 120 as they pass. However, as Packages 120 of differing sizes may be used, the resulting images will naturally include some level of blur. That is, the larger or smaller the package, the further the label may be from the focal plane of the Image Capture Devices 110. Similarly, because the Package 120 may generally be in any location on the Platform 115, they may fall outside of the focal plane/point of the Image Capture Devices 110. Generally, the further from the focal plane, the larger the amount of blur. At times, the amount of blur can be great enough to prevent accurate decoding of the images.

In an embodiment, the Image Processing Component 105 can use a set of deblur kernels to attempt to improve the quality of the captured images, as discussed in more detail below. In embodiments, each deblur kernel is defined by parameters such as size, SNR, and the like. The parameters of each deblur kernel affect the quality of the result. In some embodiments, the optimal parameters of the deblur kernel can vary based in part on the configuration and characteristics of the Image Capture Devices 110 (e.g., their locations, distances from the Packages 120, lens type and/or size, and the like).

Using a given deblur kernel to process a captured image requires some amount of computational resources and time. Although the process of applying a given kernel can be relatively efficient, it can rapidly become impractical as the number of kernels to be applied increases. Further, as the optimal kernel differs for different captured images (e.g., from different Image Capture Devices 110) as well as different Packages 120 (e.g., different size and shaped items), it is often desirable to maintain a set of deblur kernels. Thus, though it may be desirable to maintain a large number of deblur kernels and use all such kernels for all images (to ensure a high quality result for any feasible image), such a practice is inefficient and introduces significant latency in the workflow.

In some embodiments, therefore, the Image Processing Component 105 can first rank the deblur kernels based on some criteria, such as a history of successful decodes. For example, the more often using a given kernel results in a successful image decode, the higher ranked that kernel may be. Thus, the higher-ranked kernels may be more likely to result in successful image processing. In some embodiments, therefore, the Image Processing Component 105 can select one or more of the deblur kernels based on this ranking to be used for new images.

In one embodiment, if the selected deblur kernel(s) do not result in a successful decode, the Image Processing Component 105 may proceed to select the next one or more kernels in the ranking until the image is successfully decoded or no kernels remain. In some embodiments, this process may be performed sequentially (e.g., using one kernel at a time and selecting the next kernel only when the current kernel fails to result in a successful decode) or in parallel (e.g., using multiple kernels simultaneously). In at least one embodiment, the Image Processing Component 105 can also use the deblur kernels both sequentially and in parallel. For example, the Image Processing Component 105 may use the top N kernels to process captured images in parallel (to increase the probability of success with minimal latency), followed by using each additional kernel sequentially if the prior kernel(s) failed. Similarly, the Image Processing Component 105 may use the highest-ranked kernel first (to reduce computational expense), followed by using multiple kernels in parallel if the highest-ranked kernel(s) fail (to reduce the latency of decoding the image, as compared to a purely sequential approach).

In some embodiments, each time a deblur kernel is used to successfully decode an image (that is, each time using the deblur kernel on an input image yields a processed image that is successfully decoded), the Image Processing Component 105 can store a record or other indication of this success. This may include, for example, indicating that the kernel successfully deblurred the particular image or label, incrementing a count of successes (also referred to as successful decodes) for the kernel, and the like.

In an embodiment, the Image Processing Component 105 can then compute a distribution of such decode counts as a function of the kernel parameters (e.g., size and/or SNR) in order to identify the top-performing kernels (e.g., to identify the kernel parameters that are most likely to result in a successful decode). Such a distribution can then be used to rank the kernels (and to generate new kernels with particular parameters, in some embodiments) and improve the efficiency of the image processing pipeline (e.g., by reducing latency and computational resources needed). In some embodiments, the Image Processing Component 105 can iteratively refine its models by using the current distribution as a prior distribution in order to compute a new posterior distribution based on new data. This allows the system to rapidly adapt and learn for the particular environment 100.

Figure 2:
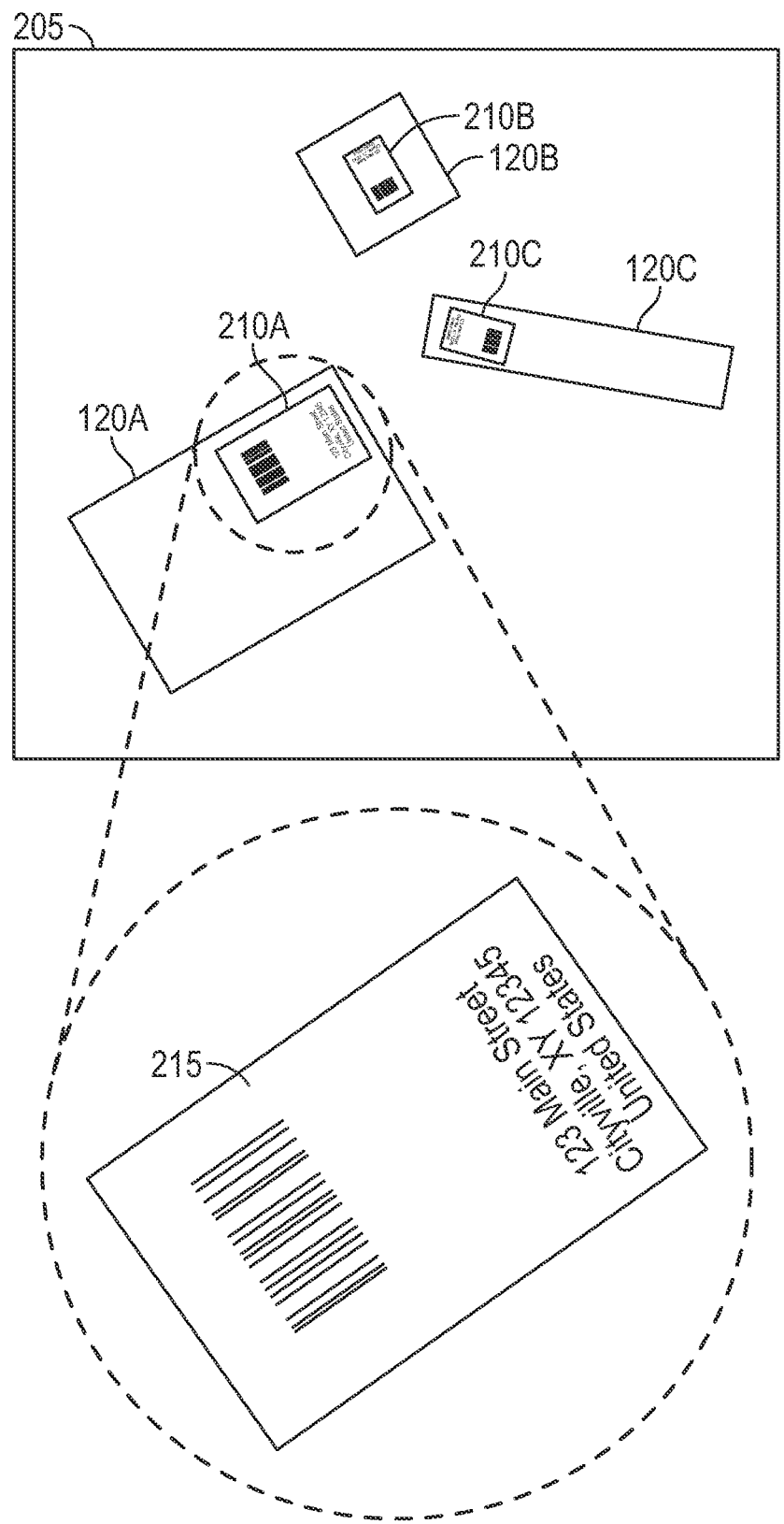
FIG. 2 depicts an image of packages with labels associated with various amounts of blur and noise captured by an automated image processing system, according to some embodiments disclosed herein.

FIG. 2 depicts an Image 205 of Packages 120 with Labels 210 associated with various amounts of blur and noise captured by an automated image processing system, according to some embodiments disclosed herein. As illustrated, the Image 205 includes three Packages 120A-C, each with a corresponding Label 210A-C. In the illustrated embodiment, the Packages 120A-C are of differing size, shape, and orientation. Because of these differences, each Label 210A-C may be associated with a differing level of blur and/or noise in the Image 205. Additionally, as environmental context changes, the level of blur and/or noise may differ for a single Label 210 based on when the image is captured.

In the illustrated embodiment, the Label 210A includes a Barcode 215. Although a Barcode 215 is used as one example discussed herein, in embodiments, the Labels 210 can generally include any identifying information, such as a Quick Response (QR) code, text, and the like. In some embodiments, the system (e.g., the Image Processing Component 105) is configured to identify and extract portions of the Image 205 that depict a Label 210 and/or Barcode 215. This can allow the Image Processing Component 105 to process each such region separately, in order to identify all Packages 120 in the Image 205.

As used herein, an image (or a region thereof) is successfully "decoded" if the Label 210, Barcode 215, or other identifying information is successfully read by the system. Generally, if the Barcode 215 is distorted (e.g., due to out-of-focus blur), it may be more difficult or impossible to decode it. By using deblur kernels, the system can improve the quality of the image (or the image region including the Barcode 215) such that it can be decoded. As discussed above, this may be modeled as a blind deconvolution process, where the particular kernel parameters that will result in success are unknown (and often unknowable at the outset). By computing decode distributions, however, embodiments of the present disclosure are able to select optimal kernels and/or kernel parameters in order to reduce the latency of the system (e.g., the time until a successful decode is available) as well as the computational resources needed.

Figure 3:
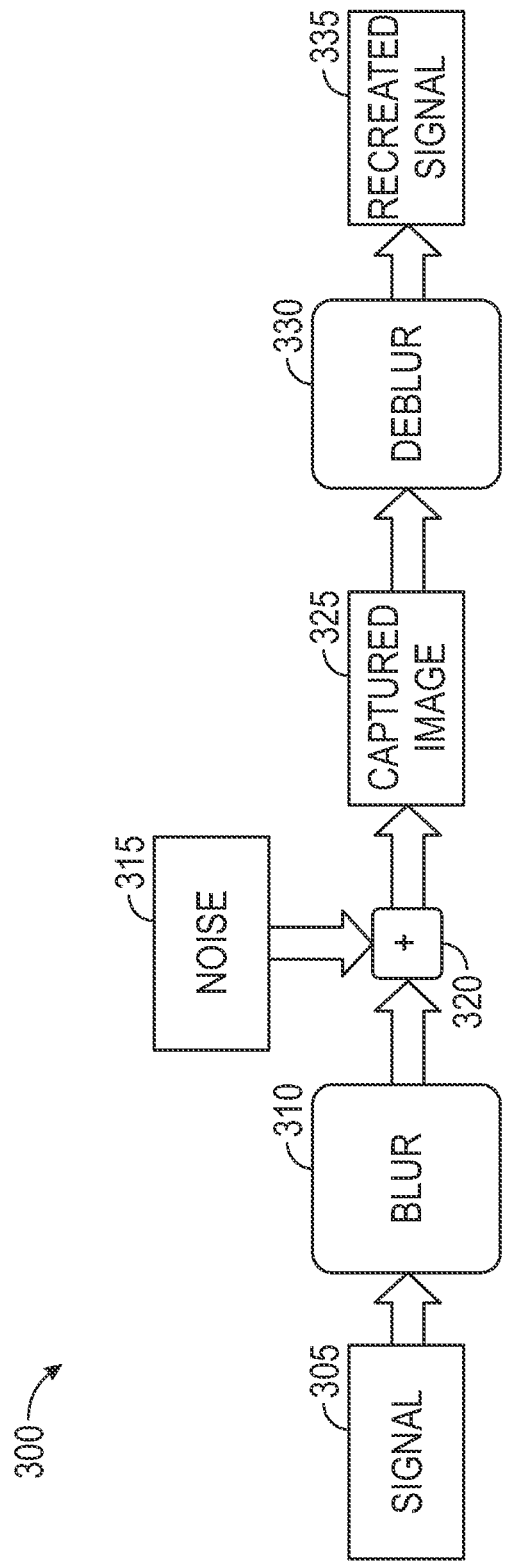
FIG. 3 illustrates a conceptual workflow to model signal distortion and subsequent processing to recreate an undistorted input, according to some embodiments disclosed herein.

FIG. 3 illustrates a conceptual workflow 300 to model signal distortion and subsequent processing to recreate an undistorted input, according to some embodiments disclosed herein. In the illustrated embodiment, an original "true" Signal 305 is emitted. As an example, this may include the light emitted or reflected by a label or barcode. In one embodiment, this Signal 305 may be defined as f. However, before being captured, this Signal 305 is subject to some Blur 310. In one embodiment, the Blur 310 is defined as h. In an embodiment, this Blur 310 may be modeled as a point spread function that is convolved with the Signal 305 to yield a blurred or distorted signal.

In the illustrated embodiment, prior to being captured, some level of Noise 315 (which may be defined as η) may also be introduced or added (indicated by the block 320) to the signal due to the nature of the environment. This results in a Captured Image 325 (which may be defined as g) that may be blurred and/or noisy. That is, the actual Captured Image 325 g may be modeled as the composite result of convolving an original Signal 305 f with some function h and adding noise q. This may be represented as g=f*h+η, where * represents convolution.

To retrieve or recreate the original signal, as illustrated, a Deblur 330 (which may be defined as h') may be applied to yield Recreated Signal 335 (referred to as f̂). In one embodiment, the Deblur 330 is performed using a deblur kernel in the form of a point spread function that is convolved with the Captured Image 325. In some embodiments, Deblur 330 also includes some aspect of noise (e.g., a defined SNR) that can help reduce or remove the Noise 315 from the image, as well as a size or diameter. Thus, the system may create a processed image f̂=g*h', where f̂≈f. In an embodiment, to improve the probability of successful decode for any given image (or region thereof), the system may use a set of deblur kernels $[h'_1, h'_2, \ldots, h'_m]$. In some embodiments, this includes using a set of kernels with defined parameters. In another embodiment, the system may dynamically create or modify the kernels with differing parameters based on the determined distributions, as discussed below in more detail.

Figure 4:
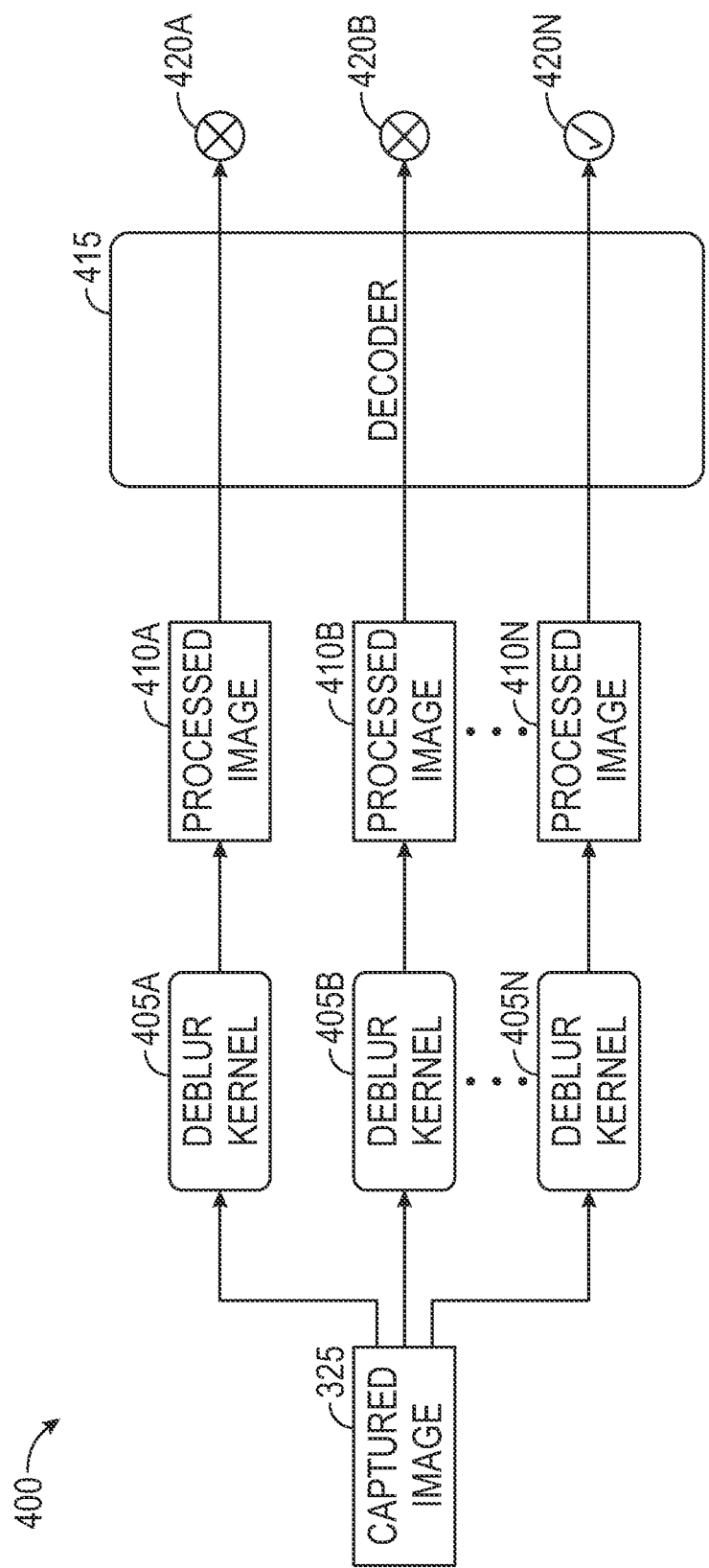
FIG. 4 depicts a workflow for processing captured images using a set of deblur kernels to provide automated image processing, according to some embodiments disclosed herein.

FIG. 4 depicts a workflow 400 for processing captured images using a set of deblur kernels to provide automated image processing, according to some embodiments disclosed herein. In the illustrated workflow 325, a Captured Image 325 may be processed using one or more Deblur Kernels 405A-N to yield a corresponding set of one or more Processed Images 410A-N. In an embodiment, processing the Captured Image 325 using a Deblur Kernel 405 comprises convolving the Captured Image 325 with the Deblur Kernel 405. In effect, this serves as an attempt to deconvolve out the blur to retrieve the original signal.

In the illustrated embodiment, each Deblur Kernel 405A-N may be associated with a particular set of parameters (e.g., a particular width, height, size, or diameter, a particular SNR, and the like). Each applied Deblur Kernel 405 results in a corresponding Processed Image 410. Although there is generally some connection between optimal kernel parameters and the physical configuration of the system, the optimal parameters are unknowable without significant experimentation, and sometimes even then cannot be deduced. Thus, although the goal may be to reduce the blur in the Captured Image 325, in embodiments, each Processed Image 410 may in fact have more blur, the same amount of blur, or less blur. This reflects the unknowable nature of blind deconvolution.

As illustrated, the Processed Images 410A-N are then processed using one or more Decoders 415. In embodiments, the Decoders 415 may include, for example, deep neural networks, image recognition systems, or any other suitable technique or component. The Decoder 415 is generally configured to receive an image (or a portion thereof) and recognize identifying information (such as barcodes). Any given Decoder 415 may succeed or fail to decode the image (or image region) based on a variety of factors including the level of blur or distortion that remains.

As indicated by the symbols 420A and 420N, the Decoder 415 was unable to decode the Processed Images 410A and 40B. That is, the Decoder 415 could not recognize or identify the identifying information (or was unable to do so with sufficient confidence). This may be because the Processed Images 410A and 410B still include too much blur. For example, the Deblur Kernels 405A and 405B may have suboptimal parameters for the particular image or image region (e.g., they may have reduced the blur too little, or may have added additional blur). As discussed herein, therefore, the Deblur Kernels 405A and 405B have failed to allow the Captured Image 325 to be decoded. In some embodiments, this is alternatively referred to as the Deblur Kernel 405A and 405B failing to cause the image to be decoded, or failing to decode the image.

In contrast, as indicated by the symbol 420N, the Decoder 415 was able to successfully decode the Processed Image 410N. That is, the Decoder 415 was able to successfully recognize/identify the identifier. For example, the Decoder 415 may have successfully read a barcode on the label. This can allow the label or package in the Captured Image 325 (or in the particular image region being processed) to be unique identified, such that the system can track and sort items in the environment.

That is, the Deblur Kernel 405N allowed the Captured Image 325 to be successfully decoded. In some embodiments, this is alternatively referred to as the Deblur Kernel 405N causing the image to be decoded, or decoding the image. Although only the Deblur Kernel 405N successfully decoded the Captured Image 325 in the illustrated workflow 400, in embodiments there may of course be multiple Deblur Kernels 405 that are able to successfully decode the input image. Additionally, in some embodiments, it may be the case that none of the Deblur Kernels 405 are able to decode the image (e.g., because it has too much blur, does not actually depict a label or barcode to be decoded, and the like).

Although the illustrated workflow 400 depicts a parallel process, in some embodiments, the system may proceed sequentially in whole or in part, as discussed above. For example, the system may first use the Deblur Kernel 405A to process the Captured Image 325. If the Deblur Kernel 405A results in a successful decode, the system may refrain from further processing and return the decoded identity of the package. This may include, for example, refraining from applying the other Deblur Kernels 405B-N, and/or stopping processing using any other Deblur Kernels 405 that are used in parallel.

In one such embodiment, if the Deblur Kernel 405A fails to decode the image, the system may select the next-highest ranked kernel (e.g., Deblur Kernel 405B) and use it to attempt to deblur the image. This process can repeat until a successful decode is found, or until no additional kernels remain. In an embodiment, when a Deblur Kernel 405 causes the image to be successfully decoded, an indication of this success is stored for subsequent use in refining the kernel rankings.

In some embodiments, any unused Deblur Kernels 405 (that is, kernels which were not used because a higher-ranked kernel was successful in decoding the image) may be used to attempt to deblur the Captured Image 325 at a later time (e.g., during off-hours when packages are not being processed) or at a different location (e.g., on a non-deployment server that is not actively processing images in a working environment). By doing so, the system can learn offline and update the decode counts for each Decode Kernel 405 without introducing latency or requiring unnecessary computational resources during runtime (e.g., while packages are still being imaged and processed).

Figure 5:
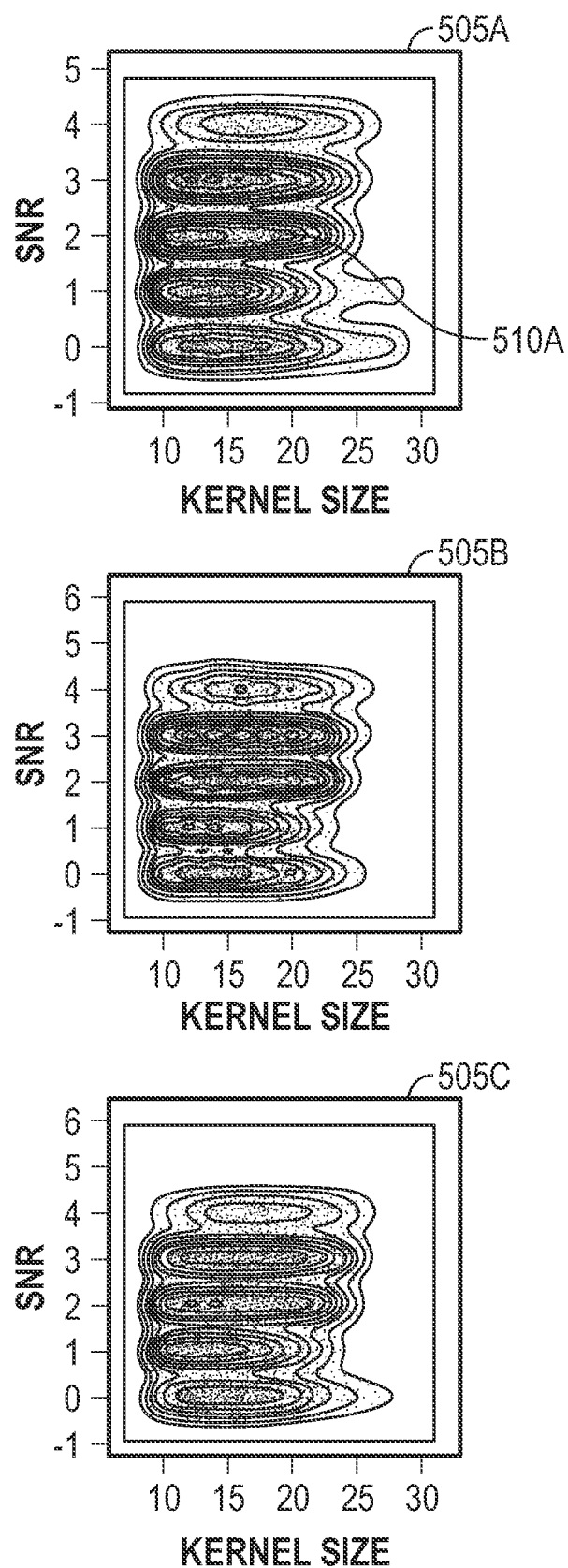
FIG. 5 depicts decode distributions based on deblur kernel parameters, according to some embodiments disclosed herein.

FIG. 5 depicts decode Distributions 505A-C based on deblur kernel parameters, according to some embodiments disclosed herein. In the illustrated Distributions 505A-C, the horizontal and vertical axes correspond to different deblur kernel parameters, and the density of the Distribution 505A-C (indicated by differing shading in the illustrated embodiment) is based on the number of successful decodes for the given deblur kernel parameters. Specifically, the kernel size is depicted on the horizontal axis, while the SNR of the kernel is depicted on the vertical axis.

Although a two-dimensional distribution is illustrated (based on two kernel parameters), the distributions may be of any dimensionality (based on any number of parameters). In one embodiment, the Distributions 505A-C are computed based on decode counts for a set of deblur kernels, each with a corresponding set of parameter values. That is, the probability that a given deblur kernel with a given pair of parameter values will result in a successful decode can be modeled as a multinomial distribution based on the known decode counts for each known set of kernel parameters.

In the illustrated Distribution 505A, the densest region of the distribution corresponds to a kernel size of roughly fourteen pixels, and a SNR of two (indicated by the point 510A). Thus, in one embodiment, the system may rank this kernel highest, and rank each other kernel according to the Distribution 505A.

The Distribution 505B may represent an updated distribution based on refining the original Distribution 505A using new data (e.g., updated decode counts for the deployment). As illustrated, the densest region of the Distribution 505B still corresponds to a kernel with a size of approximately 14 pixels and an SNR of approximately two. However, as illustrated, the overall shape of the distribution has changed, and some kernel parameters may be ranked higher or lower based on the revised Distribution 505B.

The Distribution 505C may represent another round of updates to the Distribution 505B. As can be seen, the probabilities for each set of kernel parameters have again changed (e.g., kernels with an SNR of four are now associated with a lower probability, and such kernels are therefore likely to be ranked lower). In embodiments, the Distributions 505A-C may be updated any number of times using any number of criteria. For example, they may be updated daily early in the deployment (to ensure the system adapts quickly), and less often subsequently (to encourage stability in the kernel rankings).

In one embodiment, the Distributions 505 and kernel rankings are determined based on a maximum likelihood estimation (MLE) of the data. In some embodiments, the system can model the distribution as a Dirichlet prior, and an updated posterior distribution can be computed based on the prior (existing) distribution and a set of new data (e.g., recent decodes). In at least one embodiment, the system models the distributions using a Gaussian-Gaussian distribution, rather than a Dirichlet Multinomial distribution.

In some embodiments, the system can generate a new Distribution 505 based on updated decode counts periodically, on command, or upon any other triggering criteria. In at least one embodiment, a given station or deployment (e.g., an image processing component for a given location or set of cameras) may be initialized with a distribution that was computed based on decode data from a variety of stations or locations. This can provide a useful first estimate. In some embodiments, the system utilizes a random distribution (or an equal distribution where all kernels are ranked equally) is used as the initial distribution. In embodiments, based on data collected for each individual station (or from each individual camera), the system may compute Bayesian updates for each individual station. This allows the deployment for each individual station to learn over time and results in automated kernel rankings specific to each individual deployment based on updated kernel probabilities indicated in the distribution.

Figure 6:
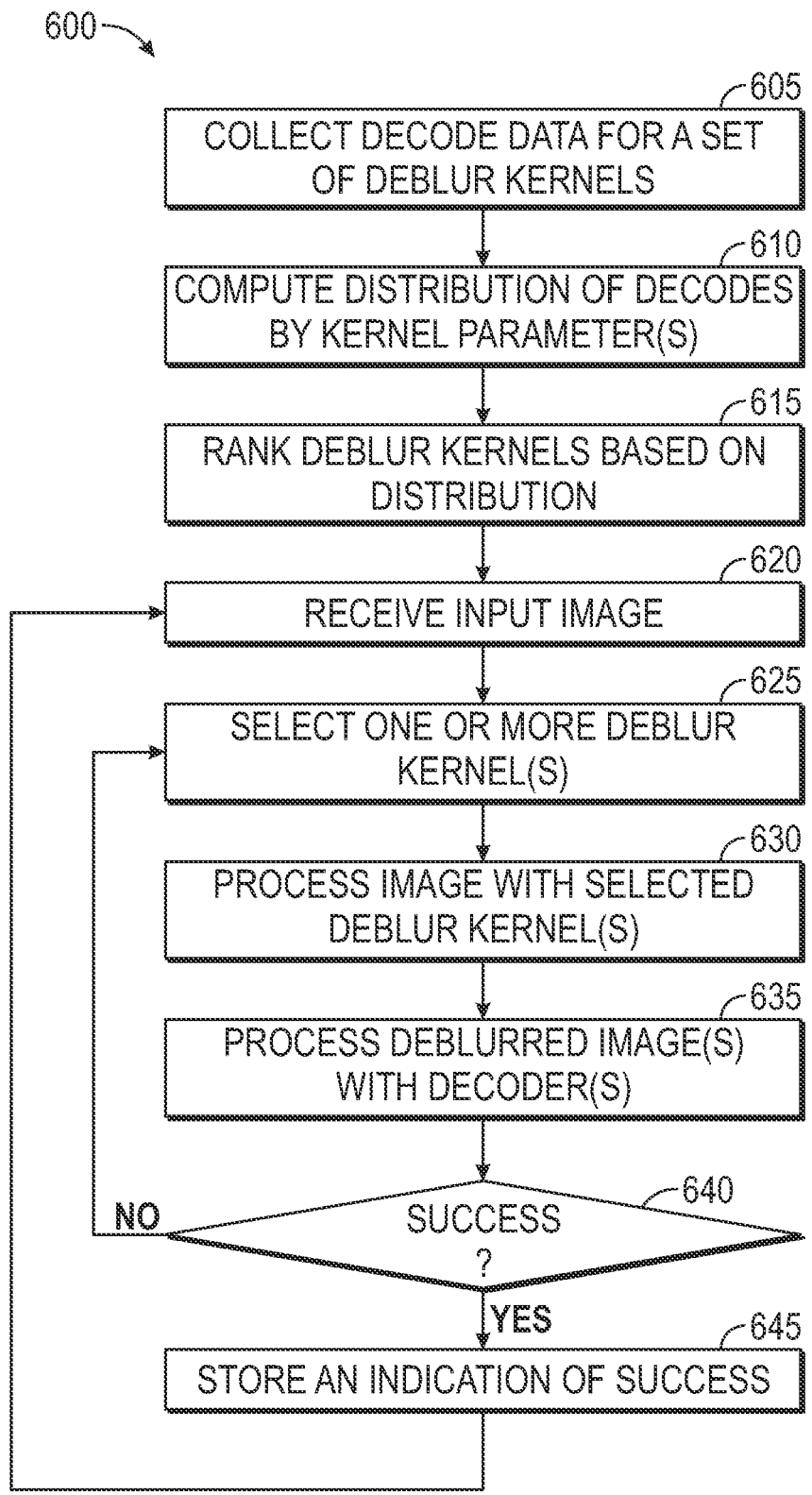
FIG. 6 is a flow diagram illustrating a method for automated image processing to improve image deblurring, according to some embodiments disclosed herein.

FIG. 6 is a flow diagram illustrating a method 600 for automated image processing to improve image deblurring, according to some embodiments disclosed herein. The method 600 begins at block 605 where an image processing system (e.g., the Image Processing Component 105) collects decode data for a set of deblur kernels. In embodiments, this decode generally relates to how often each given deblur kernel in the set of kernels allowed input images to be successfully decoded. For example, the image processing system may determine the number of times using each respective deblur kernel resulted in an image (or a portion of an image) of a barcode to be successfully decoded.

In some embodiments, the decode data is collected using one or more test or benchmark datasets of sample images. For example, each of the deblur kernels can be used to process one or more images in a benchmark dataset in order to evaluate their usefulness (e.g., in terms of the number or percentage of images that each deblur kernel was able to accurately deblur and lead to a successful decoding). In at least one embodiment, the decode data is collected across a number of stations or deployments to establish an initial baseline ranking. This data may be aggregated and used to instantiate new deployments or stations. In at least one embodiment, once additional data is available, the distributions and/or rankings may be updated on a per-station and/or per-camera basis, as discussed in more detail below.

At block 610, the image processing system computes a distribution of successful decodes based on the kernel parameters, using the collected decode data. That is, the image processing system generates a multinomial distribution indicating the probability that any given set of kernel parameters (e.g., a given SNR and size) will result in a successful decode based on the previously-collected decode counts for each deblur kernel in the set of kernels. The method 600 then continues to block 615.

At block 615, the image processing system ranks the set of deblur kernels based on the generated distribution. In some embodiments, this includes identifying one or more peaks of the distribution (e.g., the sets of kernel parameters resulting in the highest probability of a successful decode). In an embodiment, the image processing system can rank or otherwise score each deblur kernel in the set of kernels such that the highest ranking kernels are most likely to result in a successful decode. In at least one embodiment, the image processing system can additionally create or configure one or more new kernels based on the distribution. For example, if the largest peak in the distribution corresponds to a set of kernel parameters that are not reflected in the set of existing kernels, the image processing system may generate a new deblur kernel (or reconfigure an existing one) to use the determined set of parameters.

In some embodiments, this initial ranking and/or the initial distribution is used as an initialization point for deploying new stations for image processing. For example, a new barcode recognition station may be placed in a sorting facility (or a new sorting facility may be built), and the initial distribution/rankings can be used as a base starting point for the new sorting stations. In some embodiments, the distributions and rankings may be determined by a first system (e.g., a management system). These distributions and/or rankings can then be provided to a second system that receives and processes images at runtime. The method 600 then continues to block 620, where the image processing system receives an input image for processing.

The method 600 then continues to block 625, where the image processing system selects one or more deblur kernels from the set of deblur kernels based on the determined rankings. For example, the image processing system may select the k-highest-ranked kernels for initial processing. In one such embodiment, the system may select kernels in batches for parallel processing. If none of the kernels decode the image, the system may select the next k kernels for processing. In some embodiments, as discussed above, the image processing system may use one kernel at a time, or may use two or more kernels in parallel. In some embodiments, the system uses a sequential and parallel process. For example, the system may initially use kernels in sequence before using several in parallel, or initially use kernels in parallel before using them in sequence. In at least one embodiment, prior to selecting or using any deblur kernels, the image processing system can attempt to decode the received image without further processing. That is, the image processing system can use one or more decoders to attempt to read the label or barcode without attempting any deblurring. In such an embodiment, if the image can be decoded successfully, the method 600 may terminate and the image processing system can continue to wait for a new image.

At block 630, the image processing system processes the received image using the selected deblur kernel. In an embodiment, as discussed above, this involves convolving the image with the deblur kernel in an attempt to generate a deblurred image. However, as the deblur process is a blind deconvolution, it is not guaranteed that the resulting image will, in fact, have reduced blur. That is, although some embodiments discussed herein refer to generating a "deblurred image," this image may in fact have the same amount or a greater amount of blur. Referring to the image as "deblurred" indicates that it has been processed using one or more deblur kernels.

The method 600 then continues to block 635, where the image processing system attempts to decode the deblurred image using one or more decoders. In some embodiments, the decoders can include one or more pre-trained models (e.g., a deep learning neural network trained for image recognition). Generally, decoding the image can include any recognition or identification process. For example, in one embodiment, decoding the image includes attempting to read or recognize a label or other identifier (e.g., a barcode). In another embodiment, decoding the image includes detecting the presence and/or identity of particular objects, people, animals, and the like.

At block 640, the image processing system determines whether the image was successfully decoded. In one embodiment, if the decoder(s) return an identification, the image processing system can determine that the image was successfully decoded. For example, the decoder(s) may be configured to only return an identification if the confidence exceeds a threshold. In another embodiment, the image processing system may determine a confidence value for the decode (e.g., generated by the decoder) in order to determine whether it was successful. If the decode was unsuccessful, the method 600 returns to block 625. In this way, the image processing system can attempt to process the image using deblur kernels in sequence or parallel until it is successfully decoded. In one embodiment, if no deblur kernels remain, the image is flagged for manual review. In some embodiments the image processing system can also flag the subject of the image (e.g., the package on which the label is attached) for manual evaluation. For example, the image processing system may cause the conveyor or drive to stop to allow the package is removed, or may remove the package automatically.

If the image processing system determines that the decode was successful, the method 600 continues to block 645, where the image processing system stores an indication of this success. This may include, for example, incrementing a counter that indicates how often (or how many times) the selected kernel resulted in a successful decode. In some embodiments, the indication is included as part of a decode record that can include other information, such as an indication as to the particular station where the image was captured, and/or the particular camera that captured the image. In at least one embodiment, the image processing system can also store the image (or some indication of the image, such as a pointer to the image) along with the indication of the successful decode. Further, in some embodiments, the decode record can include an indication of any deblur kernels that failed to decode the image. The method 600 then returns to block 620 to receive additional images.

Figure 7:
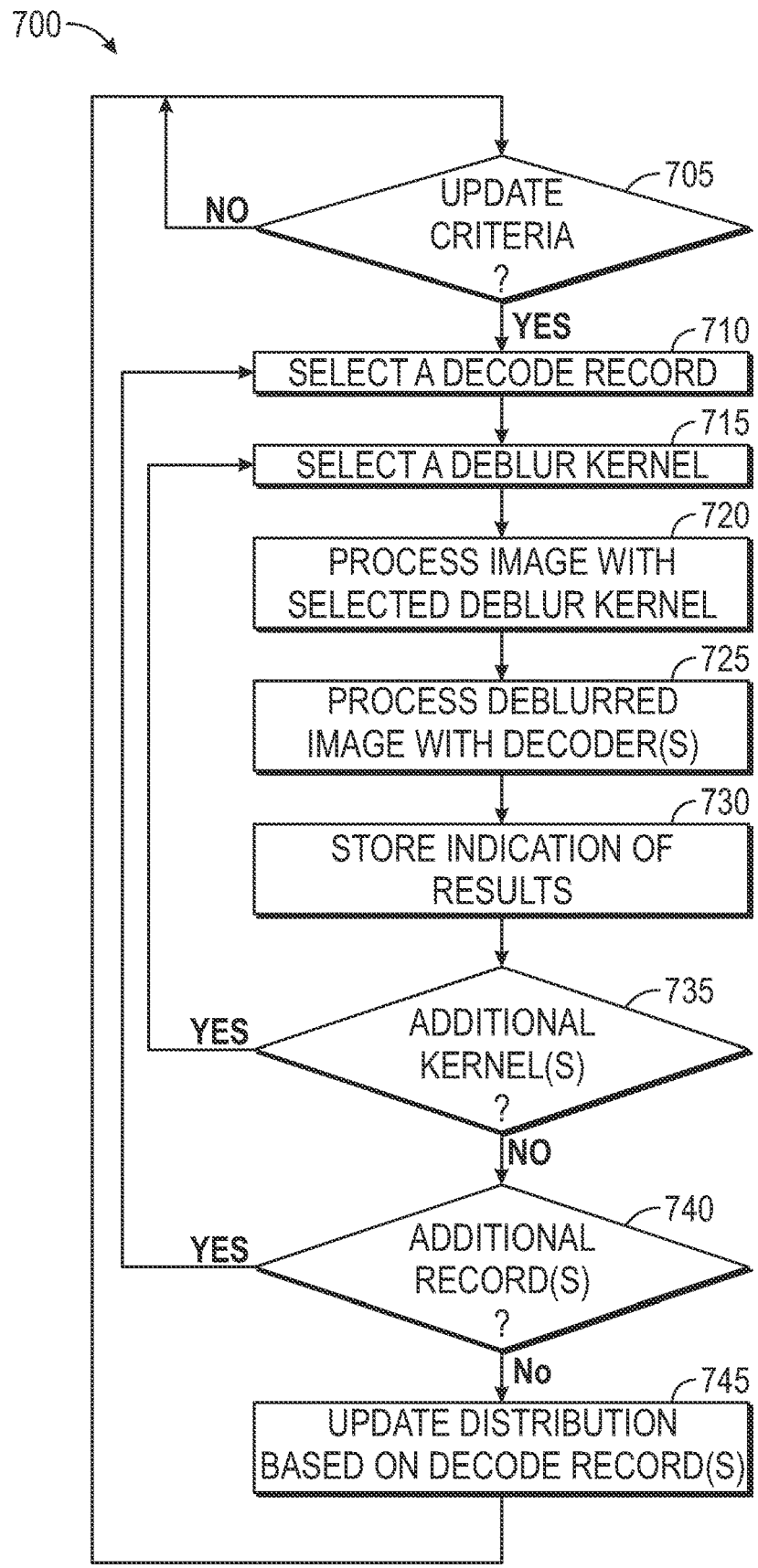
FIG. 7 is a flow diagram illustrating a method for automated calibration of image processing systems to improve image deblurring, according to some embodiments disclosed herein.

FIG. 7 is a flow diagram illustrating a method 700 for automated calibration of image processing systems to improve image deblurring, according to some embodiments disclosed herein. In one embodiment, the method 700 may be used to re-rank the deblur kernels based on updated distributions. The method 700 begins at block 705, where the image processing system determines whether one or more update criteria are satisfied. The update criteria generally indicate events that trigger a re-ranking of the kernels. In some embodiments, the image processing system preforms the method 700 during predefined times or events (e.g., when the sorting facility is not actively processing packages) in order to avoid harming the ongoing processes. In at least one embodiment, the method 700 is performed by another separate system or component (e.g., a training or calibration system) to allow the image processing system to continue to process images while the update is performed.

In one embodiment, the update criteria can include a periodic time (e.g., indicating to re-rank the kernels monthly or weekly), or a manual trigger (e.g., determining whether a user has initiated a re-rank). In some embodiments, the image processing system may determine whether to initiate a re-rank based on the current or recent accuracy of the system. For example, if a defined number or percentage of images required the image processing system to use a particular ranked kernel (e.g., the fifth ranked kernel), the image processing system may infer that the distribution is no longer accurate (e.g., due to changing conditions) and initiate a re-rank. In some embodiments, the update criteria include a latency of the system (e.g., if the average decode time exceeds a defined threshold time). In one embodiment, the system can compute updated distributions and determine whether to initiate a re-rank based on how much the new distribution differs from the prior distribution.

In at least one embodiment, the image processing system can determine whether the update criteria are satisfied on a per-station or per-camera basis, such that the rankings and/or distributions may be updated at different times for different stations or cameras.

If the criteria are not satisfied, the method 700 iterates at block 705 and the image processing system continues to process images using the current distribution and ranks. If the criteria are satisfied, however, the method 700 continues to block 710. At block 710, the image processing system selects a decode record from a previous decode. This may include, for example, retrieving an image that was previously-captured and processed during runtime. In an embodiment, when an image is successfully decoded, the image processing system stores it for future calibration of the deblur kernels and refrains from using any additional deblur kernels to process it. This may help preserve the computational resources of the system during runtime.

At block 715, the image processing system selects a kernel, from the set of the deblur kernels, that has not already been used to evaluate the image (or portion thereof) associated with the selected record. For example, if the first deblur kernel successfully caused the image to be decoded, the image processing system may select the next kernel. If the first five kernels all failed to decode the image and the sixth succeeded, the image processing system may select the seventh. The particular ordering or selection criteria may vary in embodiments, such that the deblur kernels may be selected in any order.

The method 700 then proceeds to block 720, where image processing system uses the selected deblur kernel to process the image, as discussed above. At block 725, the image processing system processes the resulting deblurred image using one or more decoders in order to determine whether the selected deblur kernel can result in a successful decode. The method 700 then continues to block 730, where the image processing system stores an indication of whether the image was successfully decoded using the selected kernel. In one embodiment, the indication is stored in the selected decode record.

At block 735, the image processing system determines whether there is at least one additional deblur kernel that has not yet been used to process the image associated with the selected decode record. If so, the method 700 returns to block 710. Otherwise, the method 700 proceeds to block 740, where the image processing system determines whether there is at least one additional decode record that has not yet been processed. In some embodiments, the image processing system updates the decode records and distributions on a per-station or per-camera basis. In such an embodiment, the image processing system may select decode records associated with a given station or camera, and evaluate only these records in updating the distribution for the camera or station. This allows the deployment to automatically calibrate to the particular context and environment, rather than requiring it to generalize across a number of deployments.

If at least one record remains to be considered for the distribution that is being updated, the method 700 returns to block 710. Otherwise, the method 700 continues to block 745. At block 745, the image processing system updates the distribution based on the decode records. For example, the image processing system may compute a new distribution based on the newly-updated decode counts of each deblur kernel. In at least one embodiment, rather than generating a new distribution, the image processing system can use the existing distribution as a prior distribution (e.g., a Dirichlet prior), and compute a posterior (updated) distribution based on the prior distribution and the newly-acquired evidence (e.g., the new decode counts). The method 700 then returns to block 705.

In some embodiments, the updated distribution is then used to generate new rankings for the deblur kernels. In at least one embodiment, the system may refrain from re-ranking the kernels based on the distribution. For example, in one such embodiment, if the revised distribution differs from the prior distribution beyond a predefined threshold (or if the distribution variance exceeds a threshold), the system may infer that something else has occurred to change the system (e.g., a camera has failed), and therefore determine not to update the rankings until a user has confirmed or approved the update. In some embodiments, the system can further generate an alert or alarm to one or more users based on the variance, allowing them to take action to rectify any issues (such as by replacing damaged cameras). In at least one embodiment, in addition or instead of considering the distribution variance before generating an alert, the system can consider the overall or recent decode rate, the recent system latency, and the like.

Figure 8:
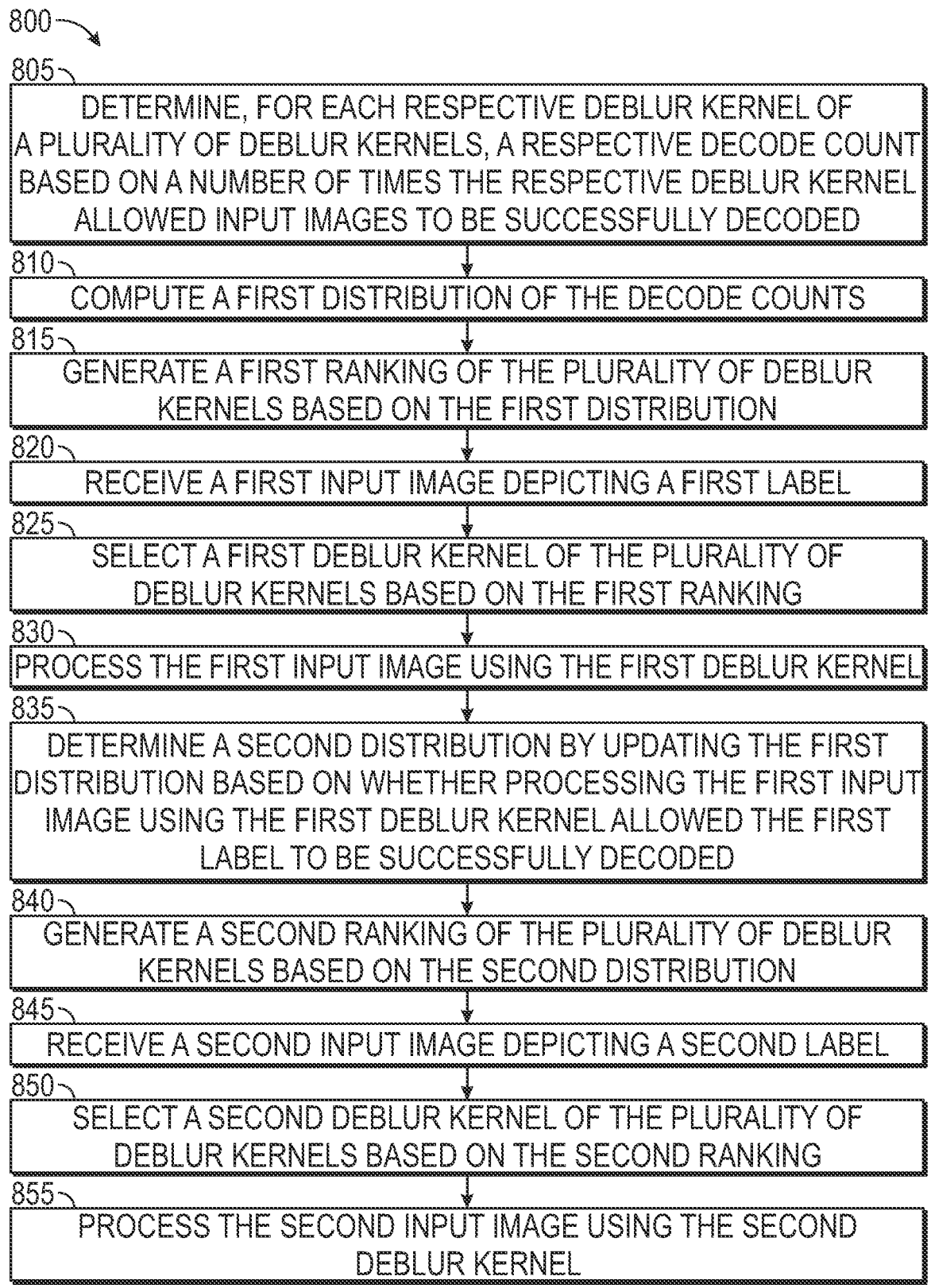
FIG. 8 is a flow diagram illustrating a method for automated calibration of image processing systems based on decode distributions, according to some embodiments disclosed herein.

FIG. 8 is a flow diagram illustrating a method 800 for automated calibration of image processing systems based on decode distributions, according to some embodiments disclosed herein. The method 800 begins at block 805, where an image processing system determines, for each respective deblur kernel of a plurality of deblur kernels, a respective decode count based on a number of times the respective deblur kernel allowed input images to be successfully decoded. At block 810, the image processing system computes a first distribution of the decode counts. Further, at block 815, the image processing system generates a first ranking of the plurality of deblur kernels based on the first distribution.

The method 800 then continues to block 820, where the image processing system receives a first input image depicting a first label. At block 825, the image processing system selects a first deblur kernel of the plurality of deblur kernels based on the first ranking. Additionally, at block 830, the image processing system processes the first input image using the first deblur kernel.

The method 800 then proceeds to block 835, where the image processing system determines a second distribution by updating the first distribution based on whether processing the first input image using the first deblur kernel allowed the first label to be successfully decoded. At block 840, the image processing system generates a second ranking of the plurality of deblur kernels based on the second distribution. Additionally, at block 845, the image processing system receives a second input image depicting a second label. The method 800 then continues to block 850, where the image processing system selects a second deblur kernel of the plurality of deblur kernels based on the second ranking. At block 855, the image processing system processes the second input image using the second deblur kernel.

Figure 9:
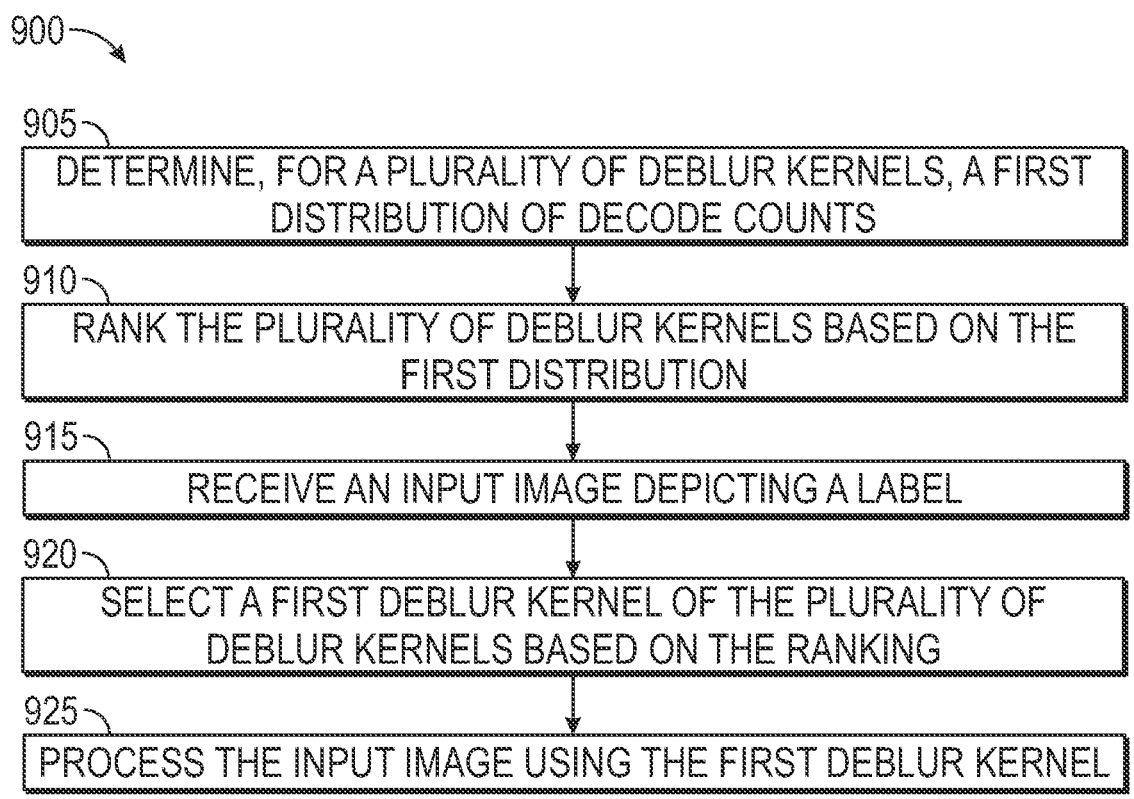
FIG. 9 is a flow diagram illustrating a method for automated image processing utilizing decode distributions, according to some embodiments disclosed herein.

FIG. 9 is a flow diagram illustrating a method 900 for automated image processing utilizing decode distributions, according to some embodiments disclosed herein. The method 900 begins at block 905, where an image processing system determines, for a plurality of deblur kernels, a first distribution of decode counts. At block 910, the image processing system ranks the plurality of deblur kernels based on the first distribution. Further, at block 915, the image processing system receives an input image depicting a label. At block 920, the image processing system selects a first deblur kernel of the plurality of deblur kernels based on the ranking. The method 900 then proceeds to block 925, where the image processing system processes the input image using the first deblur kernel.

Figure 10:
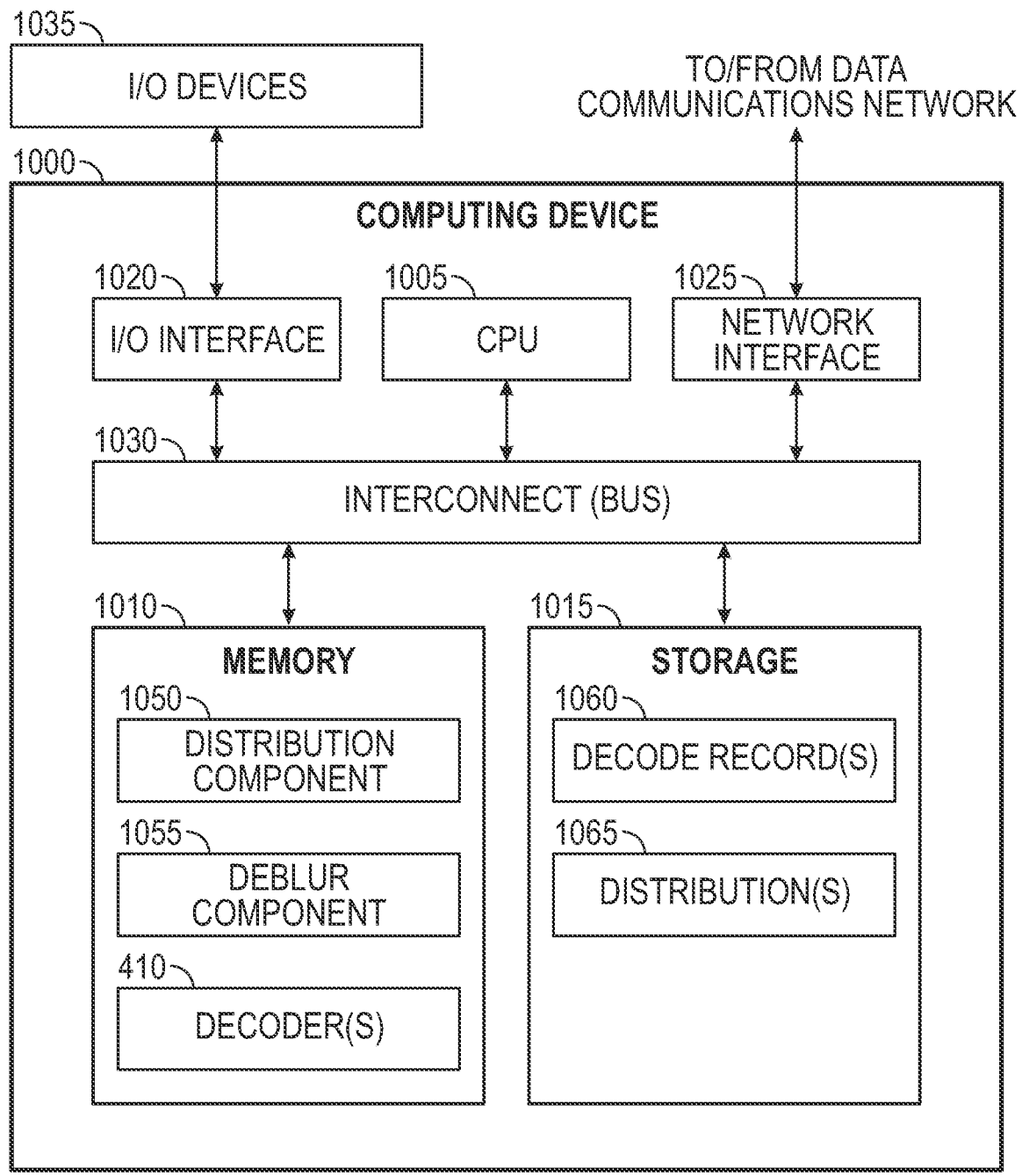
FIG. 10 is a block diagram of a computing device configured to provide automated calibration for image deblurring systems, according to some embodiments disclosed herein.

FIG. 10 is a block diagram of a Computing Device 1000 configured to provide automated calibration for image deblurring systems, according to some embodiments disclosed herein. Although depicted as a physical device, in embodiments, the Computing Device 1000 may be implemented as a virtual device or service, and/or across a number of devices (e.g., in a cloud environment). In one embodiment, the Computing Device 1000 may correspond to two or more devices or systems, where one system computes the distributions and performs updates while the other uses the distributions during runtime to process images.

As illustrated, the Computing Device 1000 includes a CPU 1005, Memory 1010, Storage 1015, one or more I/O Interfaces 1020, and a Network Interface 1025. The components are interconnected via one or more Interconnects 1030.

In the illustrated embodiment, the CPU 1005 retrieves and executes programming instructions stored in Memory 1010, as well as stores and retrieves application data residing in Storage 1015. The CPU 1005 is generally representative of a single CPU and/or GPU, multiple CPUs and/or GPUs, a single CPU and/or GPU having multiple processing cores, and the like. The Memory 1010 is generally included to be representative of a random access memory. Storage 1015 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O Devices 1035 (such as a mouse, a keyboard, a monitor, a touchscreen, etc.) are connected via the I/O Interface(s) 1020. Further, via the Network Interface 1025, the Normalization System 1000 can be communicatively coupled with one or more other devices and components (e.g., directly or via one or more network, which may include the Internet, local network(s), and the like).

In the illustrated embodiment, the Storage 1015 includes a set of Decode Records 1060 and Distributions 1065. As discussed above, each Decode Record 1060 generally corresponds to a particular image (or portion thereof), and indicates which deblur kernel(s) were able to successfully deblur the image such that it could be decoded. In some embodiments, the Decode Records 1060 also include an indication of the particular station and/or camera that captured the image. In various embodiments, each Decode Record 1060 may also include contextual information such as the date or time when the image was captured.

As discussed above, the Distributions 1065 each indicate the probability that a given set of kernel parameters can successfully decode an input image. The Distributions 1065 are constructed based on the Decode Records 1060, such that the kernels can be ranked based on their effectiveness. This allows the Computing Device 1000 (or other devices) to selectively use the most effective kernels first, reducing the delay before a successful decode is achieved without requiring extra computational resources.

In the illustrated embodiment, the Memory 1010 includes a Distribution Component 1050, a Deblur Component 1055, and one or more Decoders 410. The Distribution Component 1050, Deblur Component 1055, and Decoders 410 are generally configured to perform one or more of the embodiments discussed herein. Although depicted as software residing in Memory 1010, in embodiments, the functionality of the Distribution Component 1050, Deblur Component 1055, and Decoders 410 may be implemented using software, hardware, or a combination of software and hardware. Additionally, although depicted as discrete components for conceptual clarity, in embodiments, the operations of the Distribution Component 1050, Deblur Component 1055, and Decoders 410 may be combined or distributed across any number of components and devices.

In an embodiment, the Distribution Component 1050 uses the Decode Records 1060 to generate and update the Distributions 1065, as discussed above. The Deblur Component 1055 generally uses the Distributions 1065 to generate kernel rankings in order to prioritize deblur kernels and reduce decode latency in the image processing system. The Decoders 410 are generally configured to decode the images to identify or recognize objects, identifiers, and the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Image Processing Component 105) or related data available in the cloud. For example, the Image Processing Component 105 could execute on a computing system in the cloud and generate decode distributions, as well as rank deblur kernels to process new images. In such a case, the Image Processing Component 105 could determine kernel rankings based on distributions and store the distributions and/or decode records at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
 determining, for each respective deblur kernel of a plurality of deblur kernels, a respective decode count based on a number of times the respective deblur kernel allowed input images to be successfully decoded;
 computing a first distribution of the decode counts;
 generating a first ranking of the plurality of deblur kernels based on the first distribution;
 receiving a first input image depicting a first label;
 selecting a first deblur kernel of the plurality of deblur kernels based on the first ranking;
 processing the first input image using the first deblur kernel;

determining a second distribution by updating the first distribution based on whether processing the first input image using the first deblur kernel allowed the first label to be successfully decoded;
generating a second ranking of the plurality of deblur kernels based on the second distribution;
receiving a second input image depicting a second label;
selecting a second deblur kernel of the plurality of deblur kernels based on the second ranking; and
processing the second input image using the second deblur kernel.

2. The method of claim 1, wherein each deblur kernel of the plurality of deblur kernels is defined by a respective set of parameters comprising:
a respective signal-to-noise ratio, and
a respective diameter.

3. The method of claim 1, the method further comprising:
upon determining that processing the first input image using the first deblur kernel did not allow the first label to be successfully decoded:
selecting the second deblur kernel of the plurality of deblur kernels based on the first ranking; and
processing the first input image using the second deblur kernel.

4. The method of claim 1, the method further comprising:
for each respective deblur kernel of the plurality of deblur kernels:
processing the first input image using the respective deblur kernel;
determining whether the processed first label can be successfully decoded; and
storing an indication whether the respective deblur kernel allowed the first label to be successfully decoded; and
determining the second distribution by updating the first distribution based on the indication.

5. The method of claim 4, wherein the first distribution of the decode counts is based on data collected from a plurality of stations, and wherein the first distribution is updated based on data collected from a station where the first input image was captured.

6. A non-transitory computer readable medium comprising computer readable code executable by one or more processors to perform an operation comprising:
determining, for a plurality of deblur kernels, a first distribution of decode counts, wherein each decode count corresponds to a number of times a corresponding deblur kernel of the plurality of deblur kernels allowed input images to be successfully decoded;
ranking the plurality of deblur kernels based on the first distribution;
receiving an input image depicting a label;
selecting a first deblur kernel of the plurality of deblur kernels based on the ranking; and
processing the input image using the first deblur kernel.

7. The non-transitory computer readable medium of claim 6, wherein each deblur kernel of the plurality of deblur kernels is defined by a respective set of parameters comprising:
a respective signal-to-noise ratio, and
a respective diameter.

8. The non-transitory computer readable medium of claim 6, the operation further comprising:
upon determining that processing the input image using the first deblur kernel did not allow the input image to be successfully decoded:
selecting a second deblur kernel of the plurality of deblur kernels based on the ranking; and
processing the input image using the second deblur kernel.

9. The non-transitory computer readable medium of claim 6, the operation further comprising:
storing an indication that the first deblur kernel allowed the input image to be successfully decoded; and
determining a second distribution by updating the first distribution based on the indication.

10. The non-transitory computer readable medium of claim 9, the operation further comprising:
for each respective deblur kernel of the plurality of deblur kernels:
processing the input image using the respective deblur kernel;
determining whether the processed input image can be successfully decoded; and
storing a respective indication whether the respective deblur kernel allowed the input image to be successfully decoded; and
determining the second distribution by updating the first distribution based on the indications.

11. The non-transitory computer readable medium of claim 9, wherein determining the second distribution comprises computing a posterior distribution by using the first distribution as a Dirichlet prior.

12. The non-transitory computer readable medium of claim 9, wherein the determining the second distribution is performed upon determining that an update criterion is satisfied, wherein the update criterion relates to a current latency of processing and decoding input images.

13. The non-transitory computer readable medium of claim 6, wherein the first distribution of decode counts is based on data collected from a plurality of stations, and wherein the first distribution is updated based on data collected from a station where the input image was captured.

14. A computer-implemented method, comprising:
determining, for a plurality of deblur kernels, a first distribution of decode counts, wherein each decode count corresponds to a number of times a corresponding deblur kernel of the plurality of deblur kernels allowed input images to be successfully decoded;
ranking the plurality of deblur kernels based on the first distribution;
receiving an input image depicting a label;
selecting a first deblur kernel of the plurality of deblur kernels based on the ranking; and
processing the input image using the first deblur kernel.

15. The method of claim 14, the method further comprising:
upon determining that processing the input image using the first deblur kernel did not allow the input image to be successfully decoded:
selecting a second deblur kernel of the plurality of deblur kernels based on the ranking; and
processing the input image using the second deblur kernel.

16. The method of claim 14, the method further comprising:
storing an indication that the first deblur kernel allowed the input image to be successfully decoded; and
determining a second distribution by updating the first distribution based on the indication.

17. The method of claim 16, the method further comprising:
for each respective deblur kernel of the plurality of deblur kernels:
processing the input image using the respective deblur kernel;

determining whether the processed input image can be successfully decoded; and storing a respective indication whether the respective deblur kernel allowed the input image to be successfully decoded; and determining the second distribution by updating the first distribution based on the indications.

18. The method of claim 14, wherein the first distribution of decode counts is based on data collected from a plurality of stations, and wherein the first distribution is updated based on data collected from a station where the input image was captured.

* * * * *